United States Patent [19]

Nomoto et al.

[11] Patent Number: 4,864,490
[45] Date of Patent: Sep. 5, 1989

[54] AUTO-TUNING CONTROLLER USING FUZZY REASONING TO OBTAIN OPTIMUM CONTROL PARAMETERS

[75] Inventors: Kohei Nomoto; Tetsuo Kirimoto; Michimasa Kondo, all of Kamakura, Japan

[73] Assignee: Mitsubishi Denki Kabushiki Kaisha, Tokyo, Japan

[21] Appl. No.: 37,383

[22] Filed: Apr. 10, 1987

[30] Foreign Application Priority Data

| Apr. 11, 1986 | [JP] | Japan | 61-84714 |
| Apr. 11, 1986 | [JP] | Japan | 61-84715 |
| Apr. 11, 1986 | [JP] | Japan | 61-84716 |
| Apr. 11, 1986 | [JP] | Japan | 61-84717 |
| Apr. 11, 1986 | [JP] | Japan | 61-84718 |

[51] Int. Cl.$^4$ ............................................. G05B 13/00
[52] U.S. Cl. ................................. 364/157; 364/148; 364/162
[58] Field of Search ............................ 364/148–151, 364/157–159, 162, 513; 318/561

[56] References Cited

U.S. PATENT DOCUMENTS

| 4,466,054 | 8/1984 | Shigemasa et al. | 364/162 |
| 4,539,663 | 9/1985 | Shigemasa et al. | 364/157 |
| 4,628,435 | 12/1986 | Tashiro et al. | 364/148 |
| 4,646,226 | 2/1987 | Moon | 364/149 |
| 4,669,040 | 5/1987 | Pettit et al. | 364/157 |

OTHER PUBLICATIONS

"Process Control Using Fuzzy Logic", Mamdani et al., Fuzzy Sets Theory and Applications to Policy Analysis and Information Systems, New York: Plenum, 1980, pp. 249–265.

"The Application of Fuzzy Control Systems to Industrial Processes", King et al., Automatica, vol. 13, 1977, pp. 235–242.

"Synthesis of Fuzzy Models for Industrial Processes–Some Recent Results", Tong, Int. J. General Sys., 1978, vol. 4, pp. 143–162.

"Industrial Applications of Fuzzy Logic Control", Larsen, Int. J. Man-Machine Studies (1980), vol. 12, pp. 3–10.

Proceedings of the 24th IEEE Conference on Decision & Control, IEEE Control Systems Society, vol. 1, Dec. 1985, pp. 602–608, "Fuzzy pid Supervisor", H. R. Lemke et al.

Measurement and Control, vol. 17, No. 11, Dec. 1984/Jan. 1985, pp. 409–413, "The Use of Expert Systems in Industrial Control", B. Knight et al.

IEEE Transactions on Systems, Man, and Cybernetics, vol. SMC-15, No. 1, Jan./Feb. 1985, pp. 175–189, J. Maiers et al, "Applications of Fuzzy Set Theory".

"Industrial Application of a Self-Tuning Feedback Control Algorithm", by A. B. Corripio and F. M. Tompkins, ISA Transactions, vol. 20, No. 2, pp. 3–10, 1981.

"A Self-Tuning Controller", by H. S. Hoopes, W. M. Hawk, Jr., R. C. Lewis, ISA Transactions, vol. 22, No. 3, pp. 49–58, 1983.

Primary Examiner—John R. Lastova
Attorney, Agent, or Firm—Birch, Stewart, Kolasch & Birch

[57] ABSTRACT

An auto-tuning controller includes a fuzzy resonator for the adjustment of control parameters used in the development of a control variable for controlling the operation of a system to be controlled. A characteristic variable extractor is provided which is responsive to an error signal representative of a difference between a reference value and a controlled variable value output by the system to produce a characteristic variable indicative of the operational state of the system. Based upon this characteristic variable, a fuzzy resonator adjusts the control parameters in accordance with predetermined reasoning rules stored in a reasoning rule memory.

11 Claims, 19 Drawing Sheets

F I G .1.
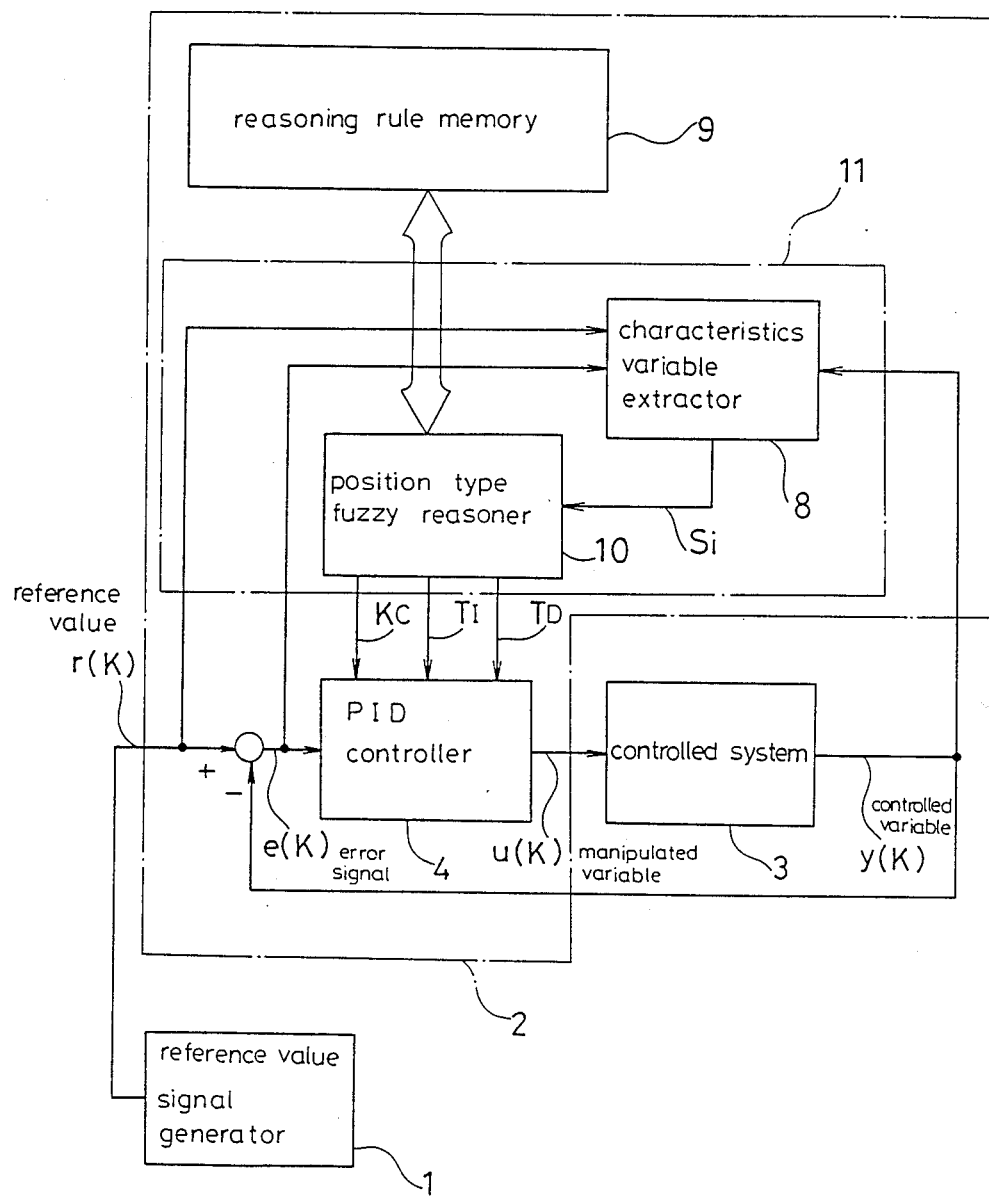

characteristics variable $S_i$ $$S_1 = \frac{1}{N}\sum_{K=1}^{N}|\mathcal{E}(K)|$$

$$S_2 = -\frac{\mathcal{E}_{peak}}{\mathcal{E}(0)}$$

⋮

FIG. 11.
(a)
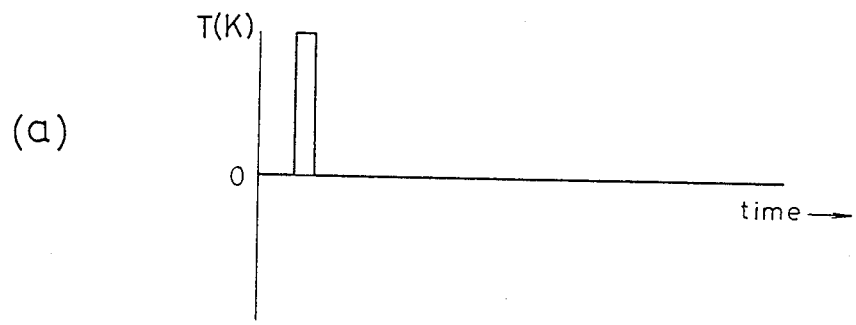
(b)
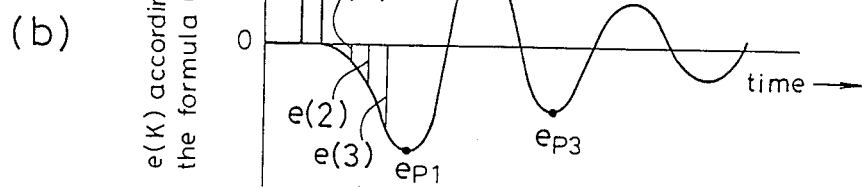
characteristics variable
$$S_1 = -\frac{1}{2}\left(\frac{e_{P2}}{e_{P1}} + \frac{e_{P3}}{e_{P2}}\right)$$
$$S_2 = \frac{1}{N}\sum_{K=1}^{N}|e(K)|$$

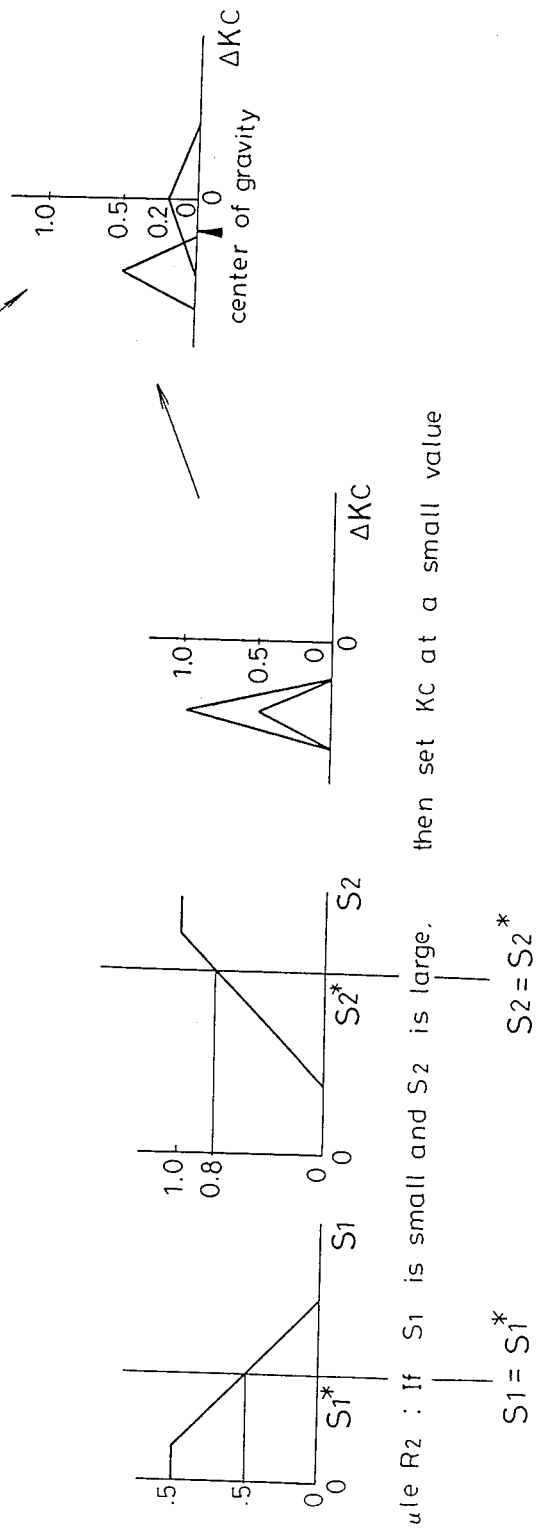
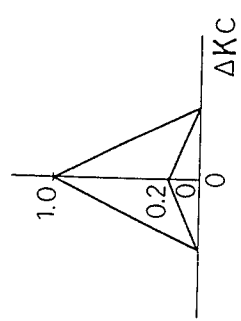
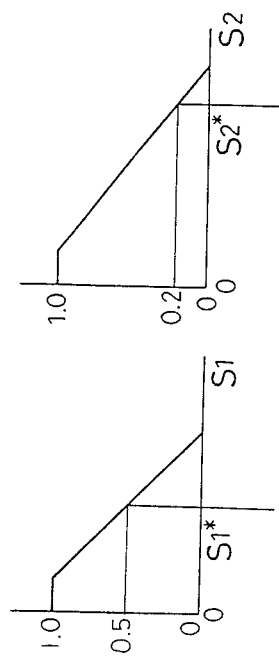
FIG. 15.

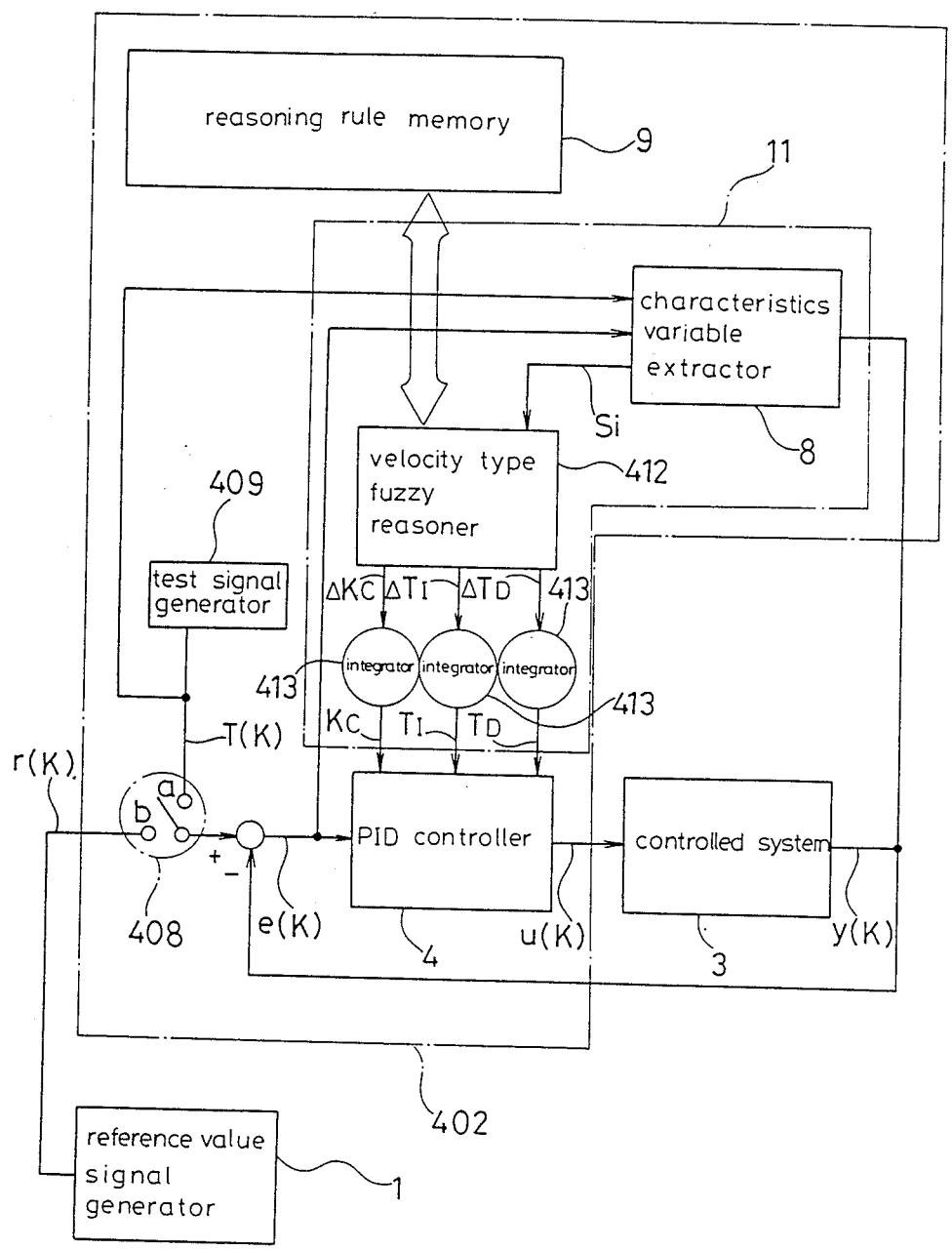
F I G .16.

FIG. 18.
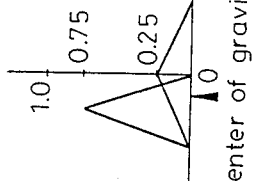
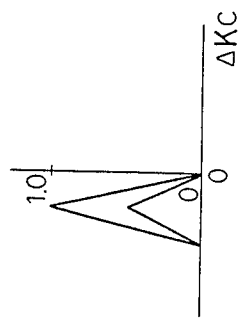
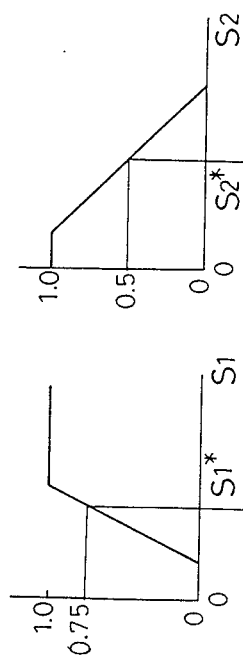
rule R1: If S1 is large and S2 is small, then set Kc at a little smaller value
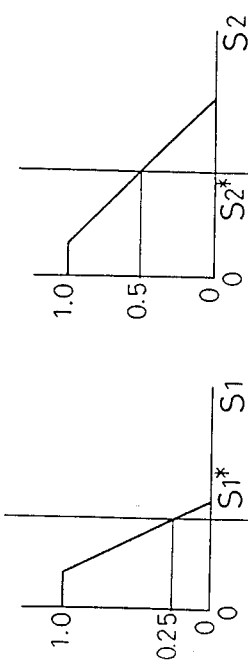
rule R2: If S1 is small and S2 is also small, then keep Kc at the present value

AUTO-TUNING CONTROLLER USING FUZZY REASONING TO OBTAIN OPTIMUM CONTROL PARAMETERS

FIELD OF THE INVENTION

The present invention relates to an auto-tuning controller which automatically adjusts control parameters in accordance with the characteristics of the controlled system. The controller is used in such applications as a process control.

BACKGROUND ART

Conventionally, an auto-tuning controller such as shown in FIG. 19 has been adopted. This type of controller is recited in an article by A. B. Corripio, P. M. Tompkins, "Industrial Application of a Self-Tuning Feedback Control Algorithm", ISA Transactions, vol. 20, No. 2, 1981, pp 3 to 10. In FIG. 19, the reference numeral 1 designates a reference value signal generator, the reference numeral 502 designates an auto-tuning controller, the reference numeral 3 designates a controlled system, the reference numeral 4 designates a PID (Proportional Integral-Derivative) controller, the reference numeral 5 designates a mathematical model operator, the reference numeral 6 designates an identifier, and the reference numeral 7 designates an adjustment operator.

The operation of this device will now be described.

The auto-tuning controller 502 receives a reference value signal r(k) which is output from the reference value signal generator 1 and a controlled variable y(k) which is output from the controlled system 3, and outputs a manipulated variable u(k) which is to be input to the controlled system 3. The values in parenthesis represent discrete timings at respective sampling intervals.

The operation within the auto-tuning controller is as described below.

First, an error e(k) between the reference value signal r(k) and the controlled variable y(k) is calculated.

$$e(k) = r(k) - y(k) \tag{1}$$

The PID controller 4 receives the error value e(k), and calculates the manipulated variable u(k) based upon previously established control parameters and outputs the same. The control parameters in the PID controller 4 are the gain $K_C$, integration time $T_I$, and differentiation time $T_D$, and the manipulated variable u(k) is calculated from these parameters according to the following equation.

$$u(k) = u(k-1) + K_C[e(k) - e(k-1) + T/T_I e(k)$$
$$+ T_D/T\{e(k) - 2e(k-1) + e(k-2)\}] \tag{2}$$

The manipulated variable u(k) is inputted to the controlled system 3 as well as the mathematical model operator 5 and the identifier 6.

The mathematical model operator 5 calculates an output v(k) from the input manipulated variable u(k), for example, according to the following formula.

$$v(k) = a_1 v(k-1) + a_2 v(k-2)$$
$$+ b_1 u(k-m-1) + b_2 u(k-m-2) \tag{3}$$

Herein, m is an integer larger than or equal to 0, which signifies a dead time.

The identifier 6 determines the coefficients $a_1$, $a_2$, $b_1$, and $b_2$ of the formula (3) such that the input-output relation of the controlled system 3 and that of the mathematical model operator 5 are equivalent to each other, that is, the outputs y(k) and v(k) of both circuits are equal to each other. For this purpose, the identifier 6 receives the manipulated variable u(k), the controlled variable y(k), and the output of the mathematical model operator v(k) as its inputs.

For the description of the operation of the identifier 6, the following vectors x(k), z(k), and $\phi(k)$ are defined.

$$x^T(k-1) = [y(k-1), y(k-2), u(k-m-1),$$
$$u(k-m-2)] \tag{4}$$

$$z^T(k-1) = [v(k-1), v(k-2), u(k-m-1),$$
$$u(k-m-2)] \tag{5}$$

$$\phi(k) = [a_1, a_2, b_1, b_2] \tag{6}$$

Herein, the suffix T of the vector represents a transport of the vector.

The identifier 6 executes the next algorithm.

$$G(k) = [1 + z^T(k)P(k) \times (k)]^{-1} z^T(k)P(k) \tag{7}$$

$$\phi(k+1) = \phi(k) + [y(k+1) - \phi(k) \times (k)]G(k) \tag{8}$$

$$P(k+1) = P(k) - P(k) \times (k)G(k) \tag{9}$$

The vector $\phi(k)$, that is, the coefficients $a_1$, $a_2$, $b_1$, and $b_2$ of the mathematical model formula (3) are obtained successively by this algorithm.

The vector $\phi(k)$ which is obtained in this way is output from the identifier 6, sent to the mathematical model operator 5 to be used for modifying the mathematical model formula, and is sent to the adjustment operator 7 to be used for obtaining the control parameters, that is, the gain $K_C$, integration time $T_I$, and differentiation time $T_D$. The adjustment operator 7 conducts the following operation in order to obtain these control parameters.

$$K_C = [a_1 + 2a_2]Q/b_1 \tag{10}$$

$$T_I = \frac{T}{\left(\dfrac{1}{a_1 + 2a_2} - 1 - \dfrac{T_D}{T}\right)} \tag{11}$$

$$T_D = \frac{T a_2 Q}{K_c b_I} \tag{12}$$

Herein, Q which appears in the formulae (10) and (12) is defined by the following formula.

$$Q = 1 - e^{-T/B} \tag{13}$$

Herein, B is an adjustment parameter, and in more specifically, a desired time constant in a closed loop.

The gain $K_C$, integration time $T_I$, and differentiation time $T_D$ obtained in this way are inputted to the PID controller 4 to be again used for calculating the manipulated variable u(k) from the error e(k) using the formula (2).

In this prior art auto-tuning controller with such a construction the identification of the controlled system must be conducted, and there are the following problems in this identification.

(1) The calculation is very complicated.
(2) The quantity of the calculations amounts to a large volume.
(3) It takes a long time for the calculation to converge.
(4) It is impossible to deal with the non-linearity possessed by the controlled system.
(5) This controller is improper for the identification of a controlled system of the type other than that which is determined by the mathematical model formula (3) because the type of mathematical model is restricted to that of the formula (3) in this controller.
(6) There arises redundancy because the four coefficients $a_1$, $a_2$, $b_1$, and $b_2$ are identified in order to obtain the three control parameters $K_C$, $T_I$, and $T_D$.

These problems in the identification have been problems in the performance of the prior art auto-tuning controller.

SUMMARY OF THE INVENTION

An object of the present invention is to provide an auto-tuning controller capable of reasoning optimum control parameters of the controlled system from the error between the controlled variable and the test signal, the controlled variable, or the test signal by using reasoning rules which have been previously obtained from the experience rules and perceptions of human beings without conducting the identification of the controlled system.

A second object of the present invention is to provide such a type of auto-tuning controller including a position type fuzzy reasoner.

A third object of the present invention is to provide a type of auto-tuning controller including a position type fuzzy reasoner which utilizes a step response of a controlled system for obtaining the characteristic variables of the controlled system.

A fourth object of the present invention is to provide a type of auto-tuning controller including a position type fuzzy reasoner which utilizes a pulse response of a controlled system for obtaining the characteristics variable of the controlled system.

A fifth object of the present invention is to provide a type of auto-tuning controller including a velocity type fuzzy reasoner.

A sixth object of the present invention is to provide a type of auto-tuning controller including a velocity type fuzzy reasoner which utilizes a pulse response of a controlled system for obtaining the characteristic variables of the controlled system.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided an auto-tuning controller comprising: a controller for controlling a controlled system; a reasoning rule memory for storing a reasoning rule to be used for determining an optimum control parameter of said controller; and an adjustment section for adjusting said optimum control parameter of said controller by a fuzzy reasoning process with the use of said reasoning rule.

BRIEF DESCRIPTION OF THE DRAWINGS

FIG. 1 is a block diagram showing an auto-tuning controller as a first embodiment of the present invention;

FIG. 11 is a diagram showing an example of evaluation by the membership function of the third embodiment;

FIG. 15 is a diagram showing the mechanism of the fuzzy reasoning of the fourth embodiment;

FIG. 16 is a block diagram showing an auto-tuning controller as a fifth embodiment of the present invention;

FIG. 18 is a diagram showing the mechanism of the fuzzy reasoning of the fifth embodiment.

DETAILED DESCRIPTION OF THE PREFERRED EMBODIMENTS

Figure 2:
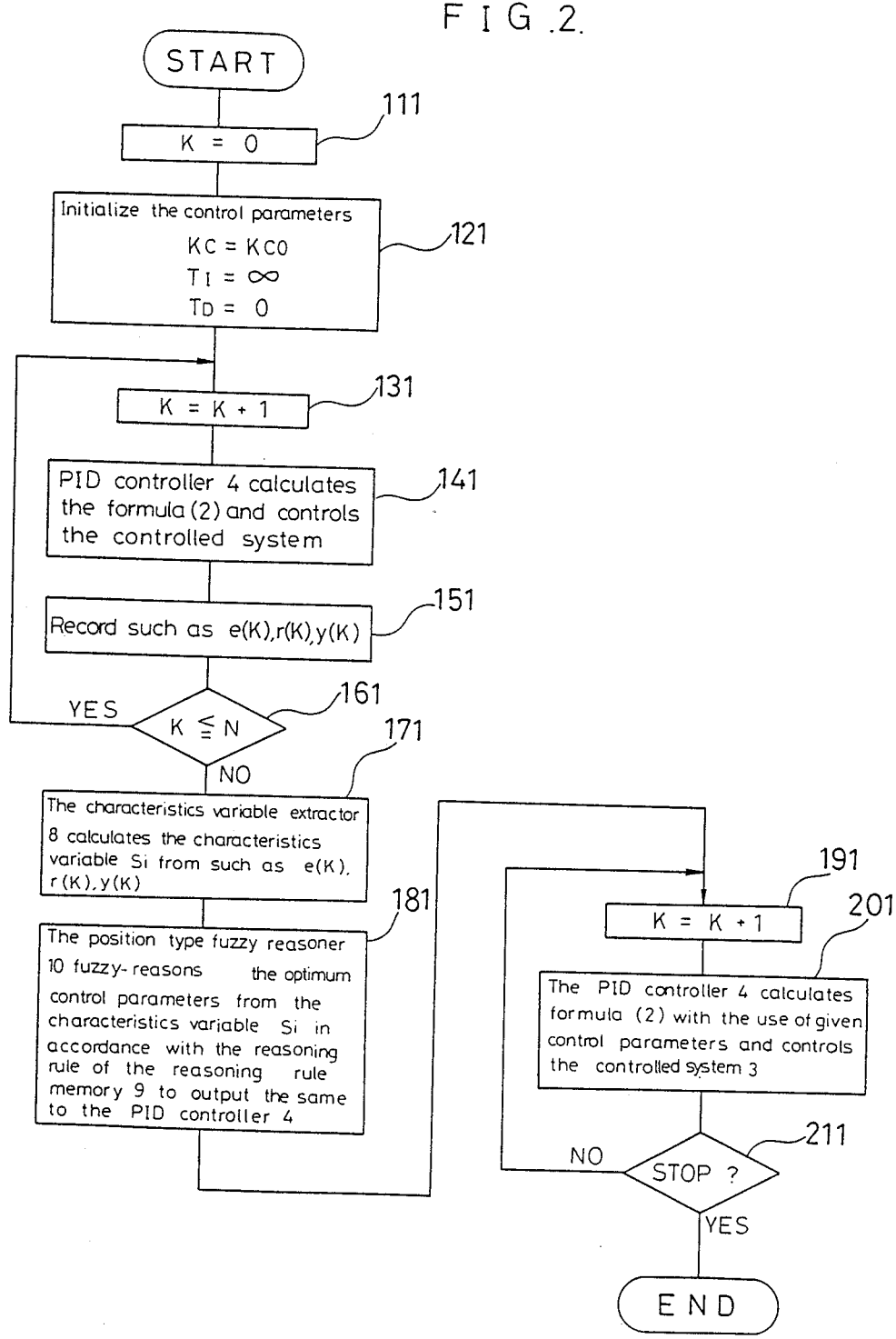
FIG. 2 is a flowchart describing the operation of the first embodiment.

In order to explain the present invention in detail, reference will be particularly made to FIG. 1.

FIG. 1 shows an auto-tuning controller as a first embodiment of the present invention. In FIG. 1, the reference numeral 1 designates a reference value signal generator, which generates a reference value signal r(k). The reference numeral 2 designates an auto-tuning controller, which receives the reference value signal r(K) and the controlled variable y(k) which is the output of the controlled system 3, and outputs the manipulated variable u(k). The reference numeral 3 designates a controlled system. This controlled system 3 receives the manipulated variable u(k) and outputs the controlled variable y(k). As described above, the controlled variable y(k) is fed back to the auto-tuning controller 2.

The internal construction of the auto-tuning controller 2 will be described.

The reference numeral 4 designates a controller, and in this embodiment a PID controller is used therefor. This PID controller 4 receives the error e(k) between the reference value signal r(k) and the controlled variable y(k), and outputs the manipulated variable u(k) in accordance with the previously established control parameters, that is, the gain $K_C$, integration time $T_I$, and differentiation time $T_D$. The reference numeral 8 designates a characteristics variable extractor which receives the error e(k), the reference value signal r(k), and the manipulated variable y(k), and outputs the characteristics variable $S_i$, $i=1, 2, \ldots, n$ representing the characteristics of the controlled system 3. The reference numeral 9 designates a reasoning rule memory which stores reasoning rules $R_j$, $j=1, 2, \ldots, m$ to be used for determination of the optimum control parameters based on the characteristics variables $S_i$. The reference numeral 10 designates a position type fuzzy reasoner which reasons and outputs the optimum control parameters, that is, the gain $K_C$, integration time $T_I$, and differentiation time $T_D$ in accordance from memory 9 upon the reasoning rule $R_j$ with receiving the input characteristics variable $S_i$. The parameters $K_C$, $T_I$, and $T_D$ are inputted to the PID controller 4 to be again used for the calculation of the manipulated variable u(k). Thus, an adjustment section 11 for adjusting the control parameters of the controller 4 by fuzzy reasoning in accordance with the reasoning rule is constituted by the characteristics variable extractor 8 and the position type fuzzy reasoner 10.

The operation of this device will be described with reference to the flowchart of FIG. 2.

First, the value of K is set to 0 at step 111. Next, the control parameters are initialized at step 121 as in the following. The gain $K_C$ is initialized at a relatively small value $K_{CO}$. The integration time $T_I$ and differentiation time $T_D$ are initialized at infinity and 0, respectively, or at maximum and minimum, respectively. The PID controller 4 calculates u(k) from the formula (2) with the use of the above-described initialized parameters and controls the controlled system 3 with the calculated variable u(k) at step 141. Meanwhile, the error e(k), the reference value signal r(k), and/or the controlled variable y(k) are recorded at step 151.

When these data are gathered over n samples as determined at step 161, the characteristics variable extractor 8 calculates the characteristics variable $S_i$, $i=1, 2, \ldots, n$ from these data at step 171. The above-described characteristics variables are as described below.

$$S_1 = \text{(mean error)} = \frac{1}{N} \sum_{k=1}^{N} |e(k)| \quad (14)$$

$$S_2 = \text{(mean error change rate)} \quad (15)$$
$$= \frac{1}{N-1} \sum_{k=2}^{N} |e(k) - e(k-1)|$$

At step 181 the position type fuzzy reasoner 10 fuzzy reasons the optimum control parameters $K_C$, $T_I$, $T_D$ from the characteristics variable Si in accordance with the reasoning rules $R_j$, $j=1, 2, \ldots, m$ stored in the reasoning rule memory 9, and outputs the same to the PID controller 4.

Thereafter, at steps 191 to 201 the PID controller 4 calculates u(k) from the formula (2) with the fuzzy reasoned use of the control parameters as described above and continues the control of the controlled system 3.

The reasoning rules $R_j$ stored in the reasoning rule memory 9 and the operation of the position type fuzzy reasoner 10 will now be described.

First, the reasoning rules $R_j$ are those produced by experience rules or perceptions which a human utilizes in conducting the adjustment of control parameters, and these are, for example, as in the following.

$R_1$: "If the mean error $S_1$ is large and the mean error change rate $S_2$ is large, than set the gain $K_C$ at an intermediate value."

$R_2$: "If the mean error $S_1$ is large and the mean error change rate $S_2$ is small, then set the gain $K_C$ at a large value."

As described above, the reasoning rule $R_j$ has a form of "If $\sim$, then $\sim$.". The portion "If $\sim$," is called a former part proposition, and the portion "then $\sim$." is called a latter part proposition.

When the latter part proposition has a form representing a value itself such as "take $\sim$ as $\sim$" or "set $\sim$ to $\sim$" as in the above-described reasoning rules $R_1$ and $R_2$, this fuzzy reasoning is called a position type fuzzy reasoning. To the contrary, when the latter part proposition has a form representing a variation of a value such as "increase $\sim$ by $\sim$" or "lengthen $\sim$ by $\sim$", this fuzzy reasoning is called as a velocity type fuzzy reasoning.

In this first embodiment of the present invention, the position type fuzzy reasoner 10 which conducts a position type fuzzy reasoning is provided. The operation of this position type fuzzy reasoner 10 will be described as follows.

In the fuzzy reasoning, at first it is evaluated by what degree the present state satisfies the condition of the former part proposition with the use of the membership function, and the degree is represented by a value between 0 and 1.

Figure 3:
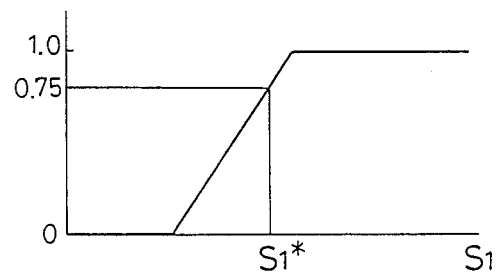
FIG. 3 is a diagram showing an example of evaluation by a membership function.

FIG. 3 shows an example of evaluation by the membership function. Herein, a proposition "the mean error $S_1$ is large" is adopted. It is assumed that the mean error calculated by the characteristics variable extractor 8 is that $S_1=S_1^*$. Then, the degree that the former part proposition is satisfied is evaluated as 0.75.

Figure 4:
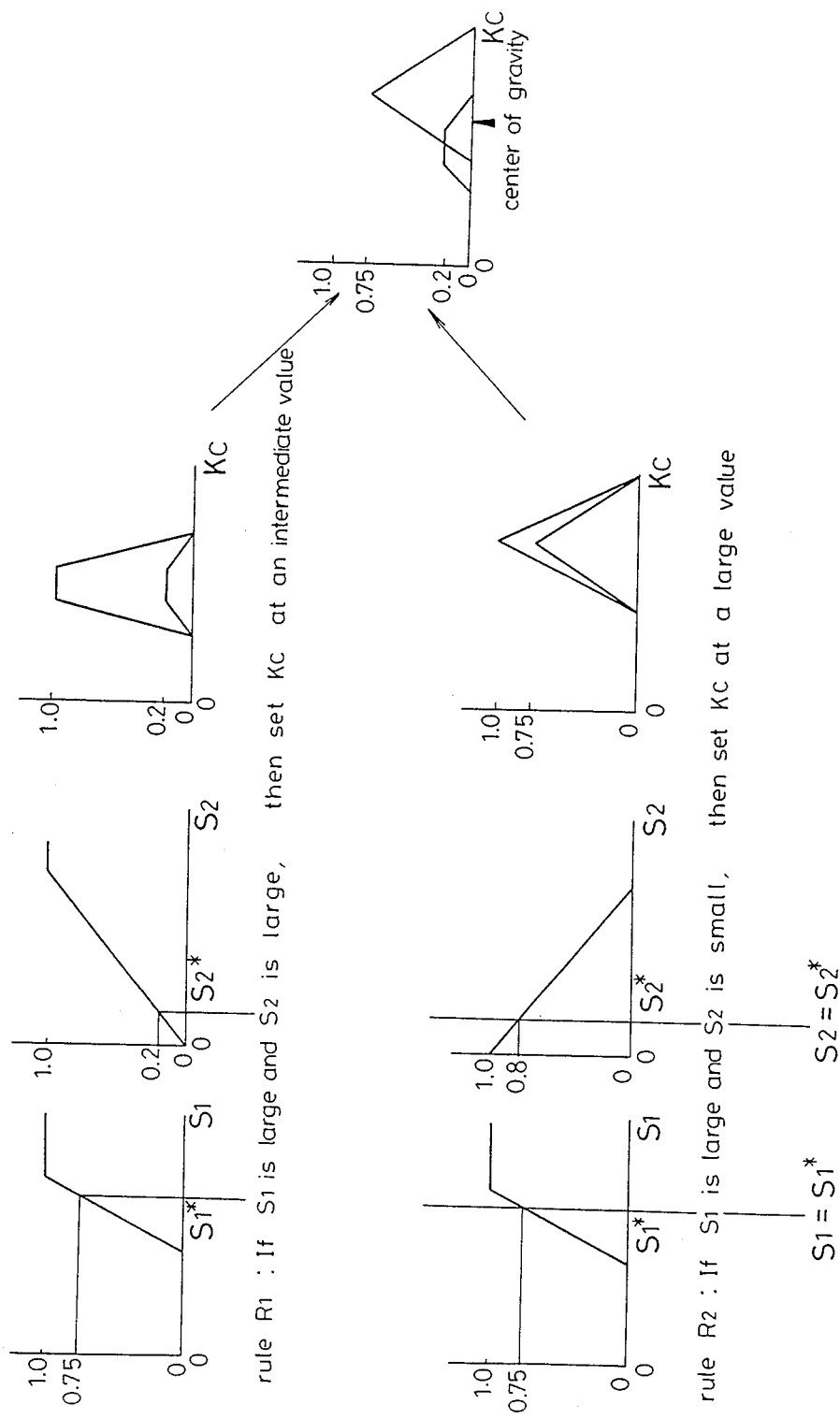
FIG. 4 is a diagram showing the mechanism of the fuzzy reasoning.

FIG. 4 shows the mechanism of the fuzzy reasoning which is conducted by the position type fuzzy reasoner 10. In this fuzzy reasoning, the mean error $S_1$ and the mean error change rate $S_2$ are selected as the characteristics variables, and the above-described rules $R_1$ and $R_2$ are used as reasoning rules. Herein, only the adjustment of the gain $K_C$ is described, but the principle of the reasoning is also applied to the adjustments of the integration time $T_I$ and the differentiation time $T_D$.

At first, the degrees to which the former part propositions of the fuzzy reasoning rules R1 and R2 are satisfied are evaluated as described above. Herein, when the former part proposition comprises a plurality of terms and has a form of "If $\sim$ and $\sim$", the lowest one among the degrees to which the respective tersm are satisfied becomes the degree to which the entirety of the former part proposition is satisfied. In the example of FIG. 4, the actual values of the mean error $S_1$ and the mean error change rate $S_2$ are that $S_1=S_1^*$ and $S_2=S_2^*$. Then, the degree to which the proposition "If the mean error $S_1$ is large" of the rule $R_1$ is satisfied is 0.75, and the degree to which the proposition "If the mean error change rate $S_2$ is large" is satisfied is 0.2. Accordingly, the degree to which the entirety of the former part proposition is satisfied is 0.2.

The latter part proposition is also represented by a membership function as shown in FIG. 4. Because the degree to which the former part proposition of the rule $R_1$ is satisfied is 0.2, the membership function of the latter part proposition is reduced to 0.2 times that of the latter part proposition itself.

Finally, the reduced membership functions of the latter part propositions of the respective rules $R_1$ and $R_2$ are superimposed, and the center of gravity of them is obtained. The value of the gain $K_C$ at this center of gravity is adopted as the optimum gain.

Similarly as above, the optimum integration time and the optimum differentiation time are determined.

Figure 5:
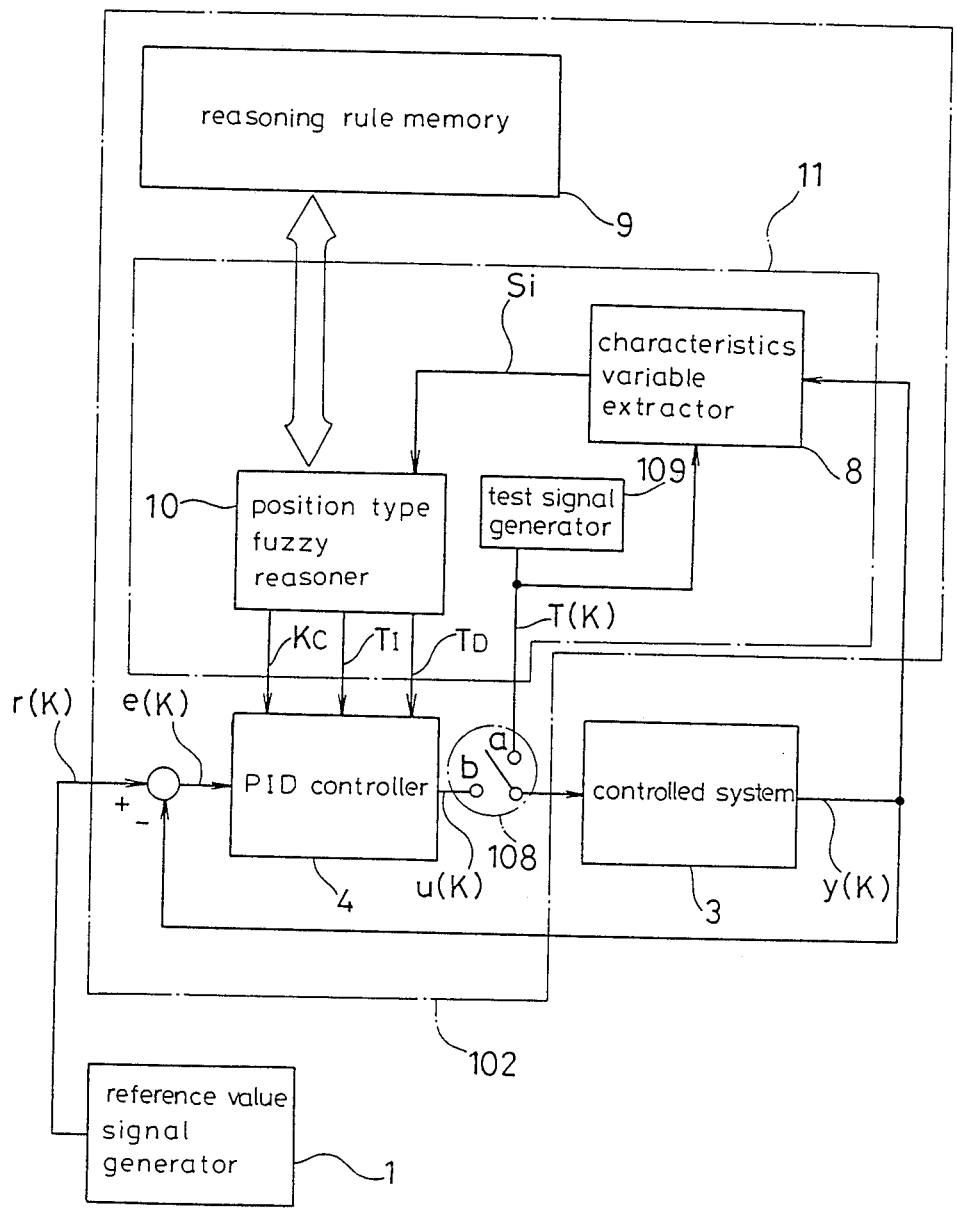
FIG. 5 is a block diagram showing an auto-tuning controller as a second embodiment of the present invention.

FIG. 5 shows a second embodiment of the present invention.

In FIG. 5 the same reference numerals designate the same elements as those shown in FIG. 1. The reference numeral 108 designates a controlled system input switch for selecting one of the manipulated variable u(k) and a test signal T(k) as the input to the controlled system 3. The reference numeral 109 designates a test signal generator for generating the test signal T(k). The characteristics variable extractor 8 receives the test signal T(k) and the output y(k) of the controlled system 3 which is a response to the test signal T(k), and outputs a characteristics variable $S_i$: i=1, 2, ..., n representing the characteristics of the controlled system 3. The reference numeral 102 designates an auto-tuning controller of this second embodiment, and the adjustment section 11 for adjusting the control parameters is constituted by the characteristics variable extractor 8, the position type fuzzy reasoner 10, and the test signal generator 109.

Figure 6:
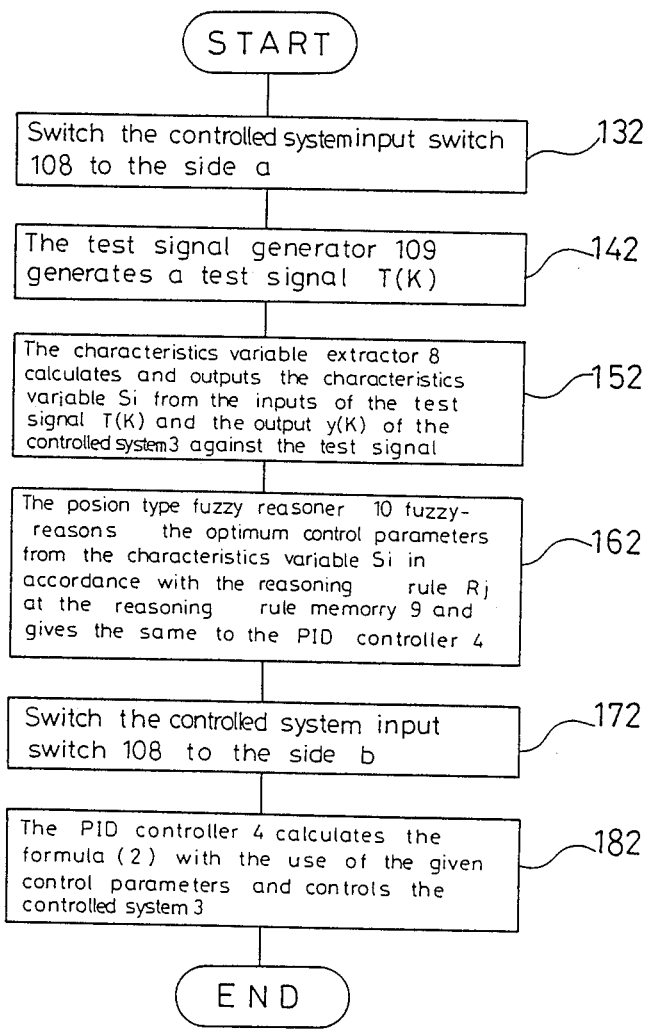
FIG. 6 is a flowchart describing the operation of the second embodiment.

The operation of this second embodiment will be described with reference to the flowchart of FIG. 6.

The operation of this embodiment is separated into a former part comprising the steps 132 to 162 of an automatic adjustment mode for conducting automatic adjustment of the control parameters and a latter part comprising the steps 172 to 182 of a control mode for conducting control of the controlled system 3 in accordance with the control parameters adjusted at the former part steps.

First, the controlled system input switch 108 is switched to the side a at step 132.

Next, the test signal generator 109 generates a test signal T(k) which is a step signal in this case at step 142. The test signal T(k) is inputted to the controlled system 3 through the controlled system input switch 108.

At step 152 the characteristics variable extractor 8 receives the test signal T(k) and the output y(k) of the controlled system 3 in response to the test signal, calculates the characteristics variable $S_i$ representing the control characteristic of the controlled system 3 and outputs the same.

At step 162, the position type fuzzy reasoner 10 fuzzy-reasons the optimum control parameters from the characteristics variable $S_i$ in accordance with the reasoning rule $R_j$ stored in the reasoning rule memory 9, and outputs the same to the PID controller 4.

Thus, the former part operation, that is, the automatic adjustment of the control parameters is concluded.

The latter part operation comprises the steps 172 and 182 of the control mode for conducting control of the controlled system 3 after the adjustment of the control parameters.

At step 172, the controlled system input switch 108 is switched to the terminal b. Thus, the input to the controlled system 3 is switched from the test signal T(k) to the manipulated variable u(k) which is the output of the PID controller 4.

At step 182 the PID controller 4 calculates u(k) from the formula (2) with the use of given control parameters and controls the controlled system 3.

Figure 7:
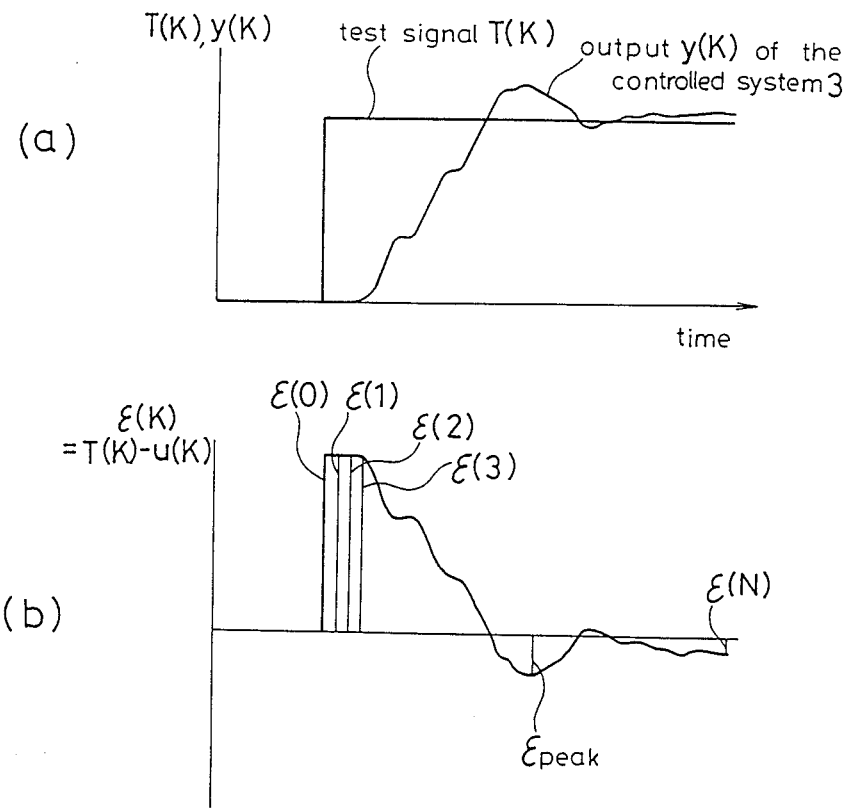
FIG. 7 is a diagram showing an example of evaluation by the membership function of the second embodiment.

FIG. 7 shows an example of fuzzy reasoning by which the characteristics variable $S_i$ is calculated from the test signal T(k) and the output y(k) of the controlled system 3 which is a response to the test signal T(k). Herein, a step signal is used as the test signal T(k). As the characteristics variable $S_i$ $S_1$ and $S_2$ are, selected with the use of the response error $\epsilon(k)$ of the controlled system 3 in response to the test signal T(k) as shown below.

$$\epsilon(k) = T(k) - y(k) \tag{16}$$

$$S_1 = \frac{1}{N} \sum_{k=1}^{N} |\epsilon(k)| \tag{17}$$

$$S_2 = -\frac{\epsilon_{peak}}{\epsilon(0)} \tag{18}$$

Herein, N is a positive integer which is previously established, and $\epsilon_{peak}$ is the maximum peak of $\epsilon(k)$ at the negative side.

In this second embodiment of the present invention, the position type fuzzy reasoner 10 which conducts the position type fuzzy reasoning is provided. The operation thereof will be described as follows.

Figure 8:
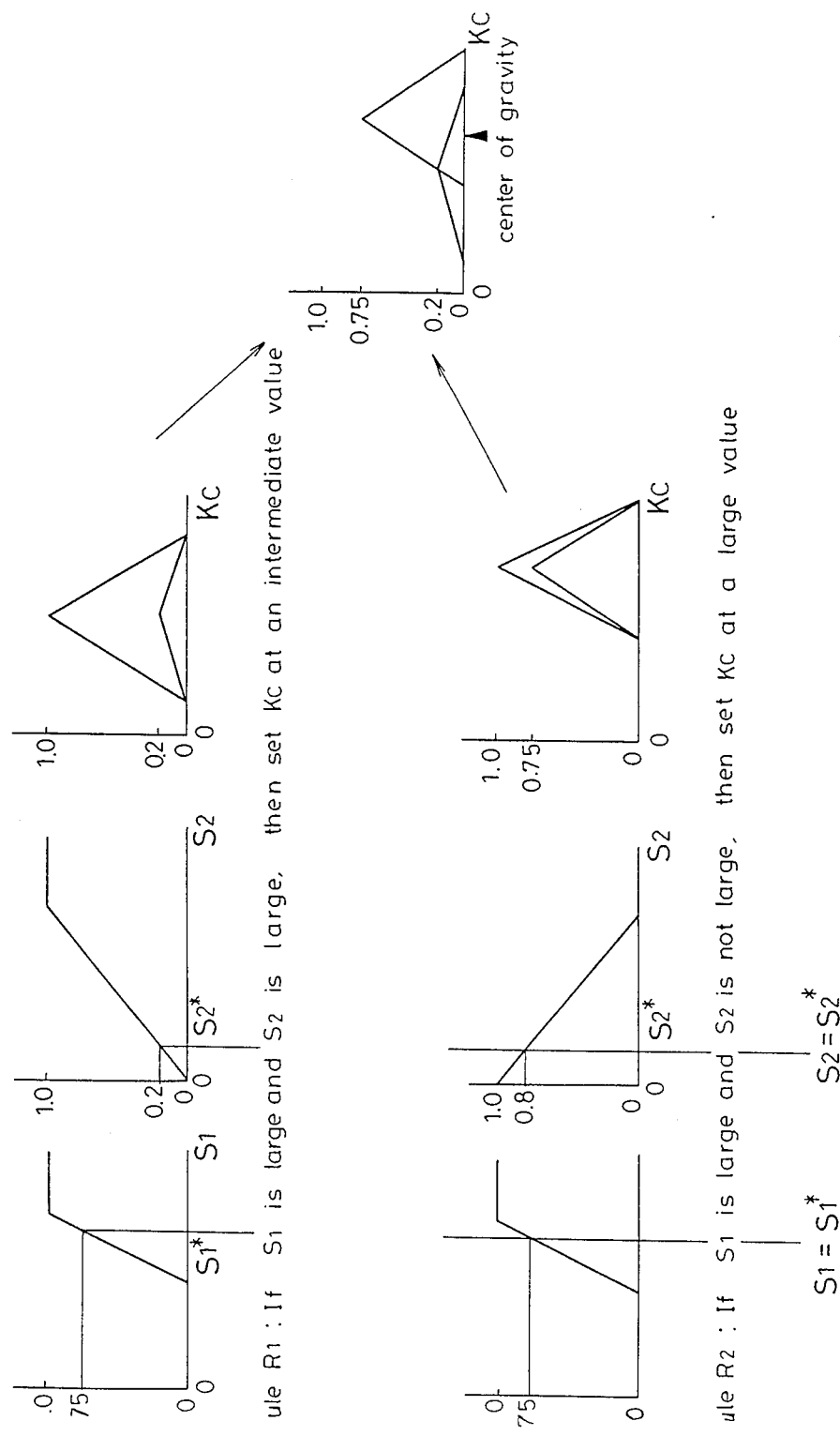
FIG. 8 is a diagram showing the mechanism of the fuzzy reasoning of the second embodiment.

FIG. 8 shows the mechanism of the position type fuzzy reasoning. Herein, the variables $S_1$ and $S_2$ of the formulae (17) and (18) are selected as characteristics variables, and $R_1$ and $R_2$ which are described below are used as reasoning rules.

$R_1$: "If $S_1$ is large and $S_2$ is also large, then set $K_C$ at an intermediate value."

$R_2$: "If $S_1$ is large and $S_2$ is not large, then set $K_C$ at a large value."

First it is evaluated as to what degree the present state satisfies the condition of the former part proposition of the fuzzy reasoning rules $R_1$ and $R_2$. Herein, the actual values of $S_1$ and $S_2$ are assumed to be that $S_1=S_1^*$ and $S_2=S_2^*$. These values are evaluated by the membership functions. For example, with respect to the reasoning rule $R_1$, if $S_1$ is large and $S_2$ is also large as shown by the left side two graphs at the upper end of FIG. 8 it is evaluated that the present state satisfies the propositions to the degree of 0.75 and 0.2, respectively. Then, it is judged that the former part proposition of the rule $R_1$ is satisfied to the degree of 0.2 as the lower value among them.

The latter part proposition "set the $K_C$ at an intermediate value" is also represented by a membership function, and this membership function is weighted by the degree to which the former part proposition comes into existence.

Finally, the weighted membership functions of the latter part propositions of the respective rules $R_1$ and $R_2$ are superimposed and their center of gravity is obtained. The value of the gain $K_C$ at this center of gravity is adopted as the optimum gain.

Similar operations as those described above are conducted also for the integration time and differentiation time.

In this way, the position type fuzzy reasoner 10 determines the optimum control parameters.

Figure 9:
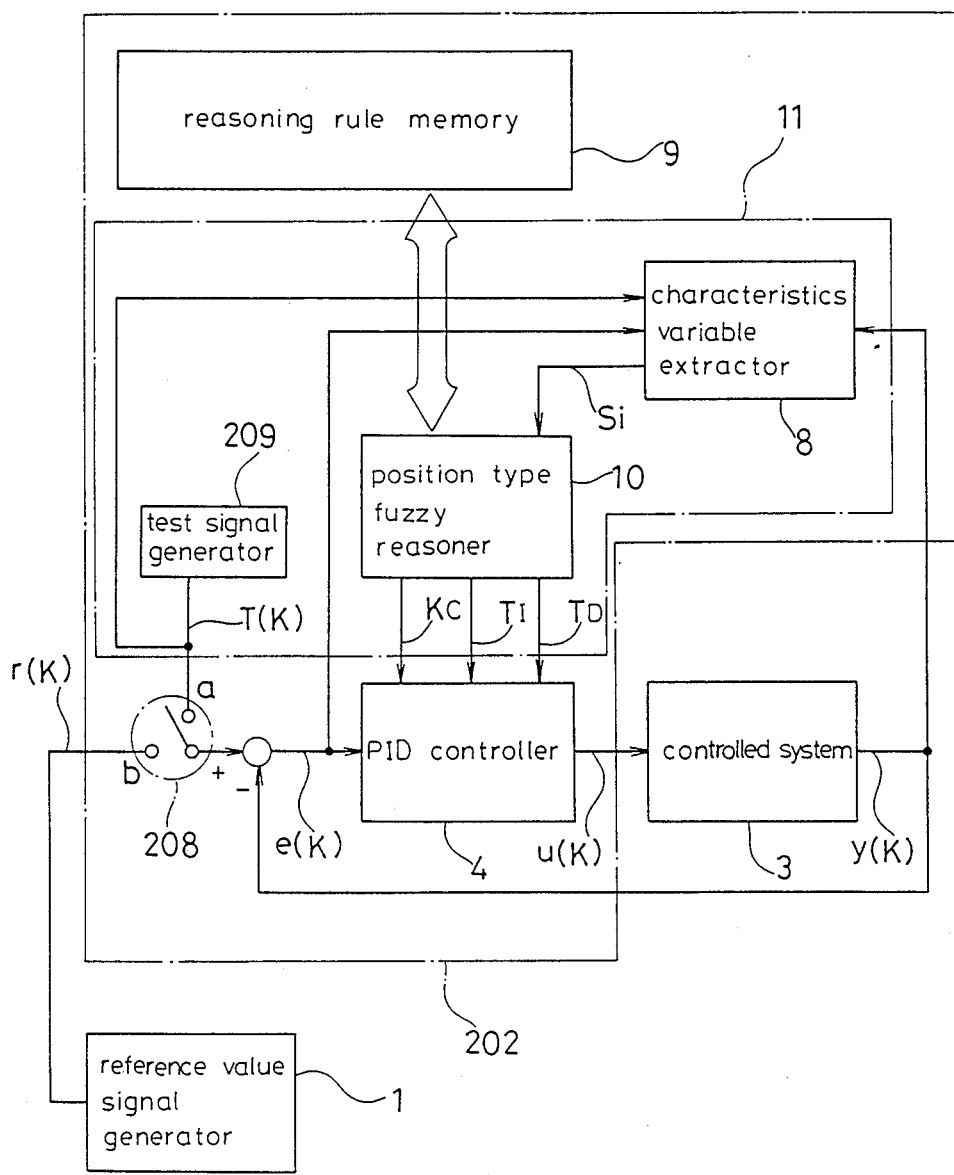
FIG. 9 is a block diagram showing an auto-tuning controller as a third embodiment of the present invention.

FIG. 9 shows a third embodiment of the present invention. In FIG. 9 the same reference numerals designate the same elements as those shown in FIGS. 1 and 5. In this embodiment, an error switch 208 is provided at a stage prior to the PID controller 4 so as to select one of error inputs e(k) which correspond to the error between the reference value signal r(k) and the output y(k) of the controlled system 3 and the error between the test signal T(k) and the output y(k). The selected error e(k) is inputted to PID controller 4. Furthermore, the auto-tuning controller 202 of this third embodiment receives the reference value signal r(k) and the controlled variable y(k) which is the output of the controlled system 3, and outputs manipulated variable u(k). The output y(k) of the controlled system 3 is fed back to the auto-tuning controller 202. In this embodiment the adjustment section 11 for adjusting the control parameters is constituted by the characteristics variable extractor 8, the position type fuzzy reasoner 10, and the test signal generator 209.

Figure 10:
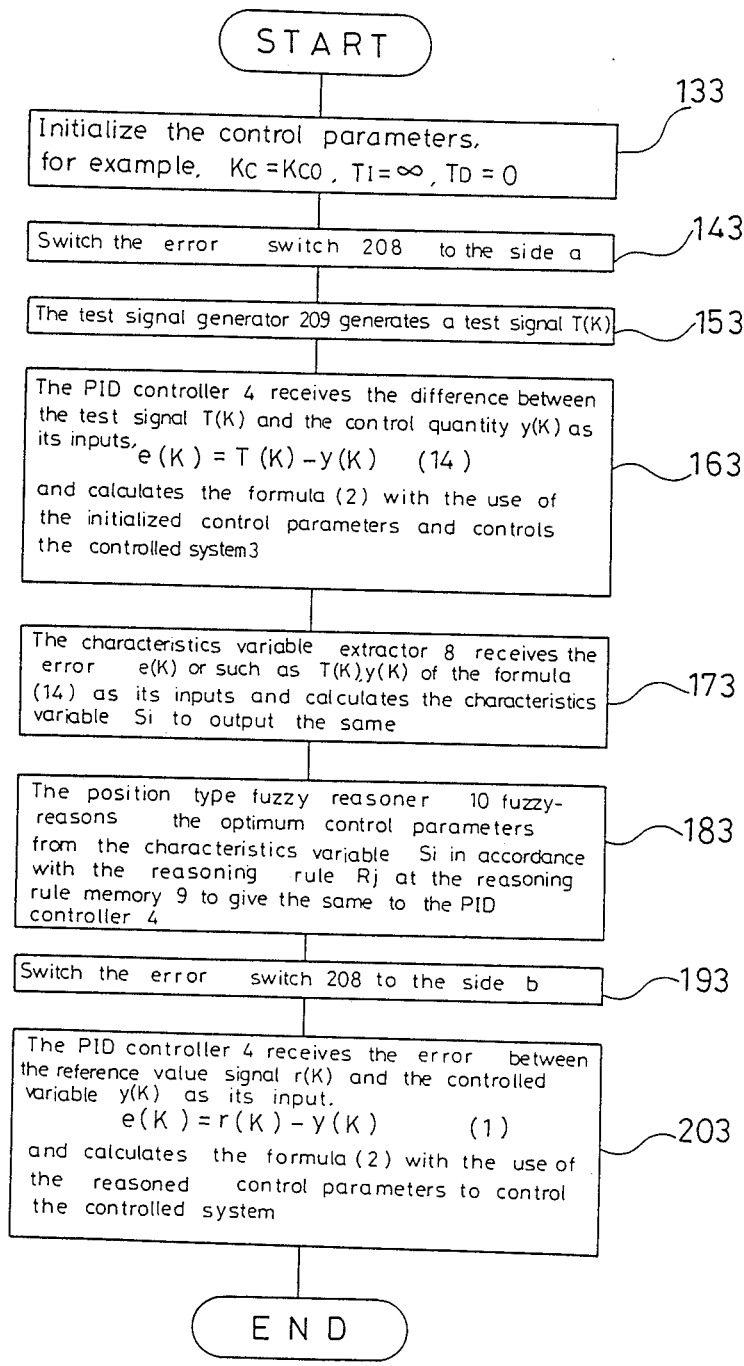
FIG. 10 is a flowchart describing the operation of the third embodiment.

The operation of this third embodiment will be described with reference to the flowchart of FIG. 10.

In this flowchart, the former part steps 133 to 183 constitute an automatic adjustment mode for conducting the automatic adjustment of the control parameters, and the latter part steps 193 and 203 constitute a control mode for conducting the control of the controlled system in accordance with the control parameters adjusted at the former part steps.

First, at step 133 the control parameters are initialized at appropriate values. For example, the gain $K_C$ is set at a relatively small value $K_{C0}$, the integration time $T_I$ and differentiation time $T_D$ are set at infinity and 0, or at maximum and minimum, respectively.

At steps 143 to 163 the PID controller 4 receives the error e(k), between the test signal T(k) which is a pulse signal in this case, and the controlled variable y(k), $$e(k) = T(k) - y(k) \tag{19}$$

That is, the PID controller 4 controls the controlled system 3 in accordance with the test signal T(k) and the initiallized control parameters.

At step 173 the characteristics variable extractor 8 receives the error e(k) of the formula (17), and T(k), y(k) as its inputs, and calculates the characteristics variable $S_i$ representing the control property of the controlled system 3 to output the same.

At step 183, the position type fuzzy reasoner 10 determines the optimum control parameters from the characteristics variable $S_i$ in accordance with the reasoning rule $R_j$ stored in the reasoning rule memory 9, and outputs the same to the PID controller 4.

Having done the above-described steps, the operation of the automatic adjustment of control parameters, that is, the adjustment mode is concluded.

At step 193 the auto-tuning controller enters the control mode for controlling the controlled system 3 in accordance with the reference value signal r(k), and at step 203 the main operation of the control mode is conducted.

The characteristics variable $S_i$ which is output from the characteristics variable extractor 8, the reasoning rule $R_j$ stored in the reasoning rule memory 9, and the position type fuzzy reasoning conducted by the position type fuzzy reasoner 10 will be described. Herein, the automatic adjustment of the gain is only described for simplification.

FIG. 11 shows an example of the characteristics variable $S_i$. It is assumed that a pulse signal shown in the graph at FIG. 11(a) is used as the test signal T(k). In this case the error e(k) between the test signal and the controlled variable according to the formula (19) becomes as shown in the graph at FIG. 11(b). From the characteristics of the waveform of the error e(k) the characteristics variables $S_i$ are obtained, for example, as follows.

$$S_1 = -\frac{1}{2}\left(\frac{e_{p2}}{e_{p1}} + \frac{e_{p3}}{e_{p2}}\right) \tag{20}$$

$$S_2 = \frac{1}{N}\sum_{k=1}^{N}|e(k)| \tag{21}$$

Herein, $e_{p1}$, $e_{p2}$, and $e_{p3}$ designate the negative, positive, and negative peak values which appear after the test signal, respectively, and e(1), ..., e(N) designate errors from after the test signal up to a predetermined time thereafter.

In this third embodiment of the present invention, the position type fuzzy reasoner 8 which conducts position type fuzzy reasoning is provided. The operation thereof will be described as follows.

Figure 12:
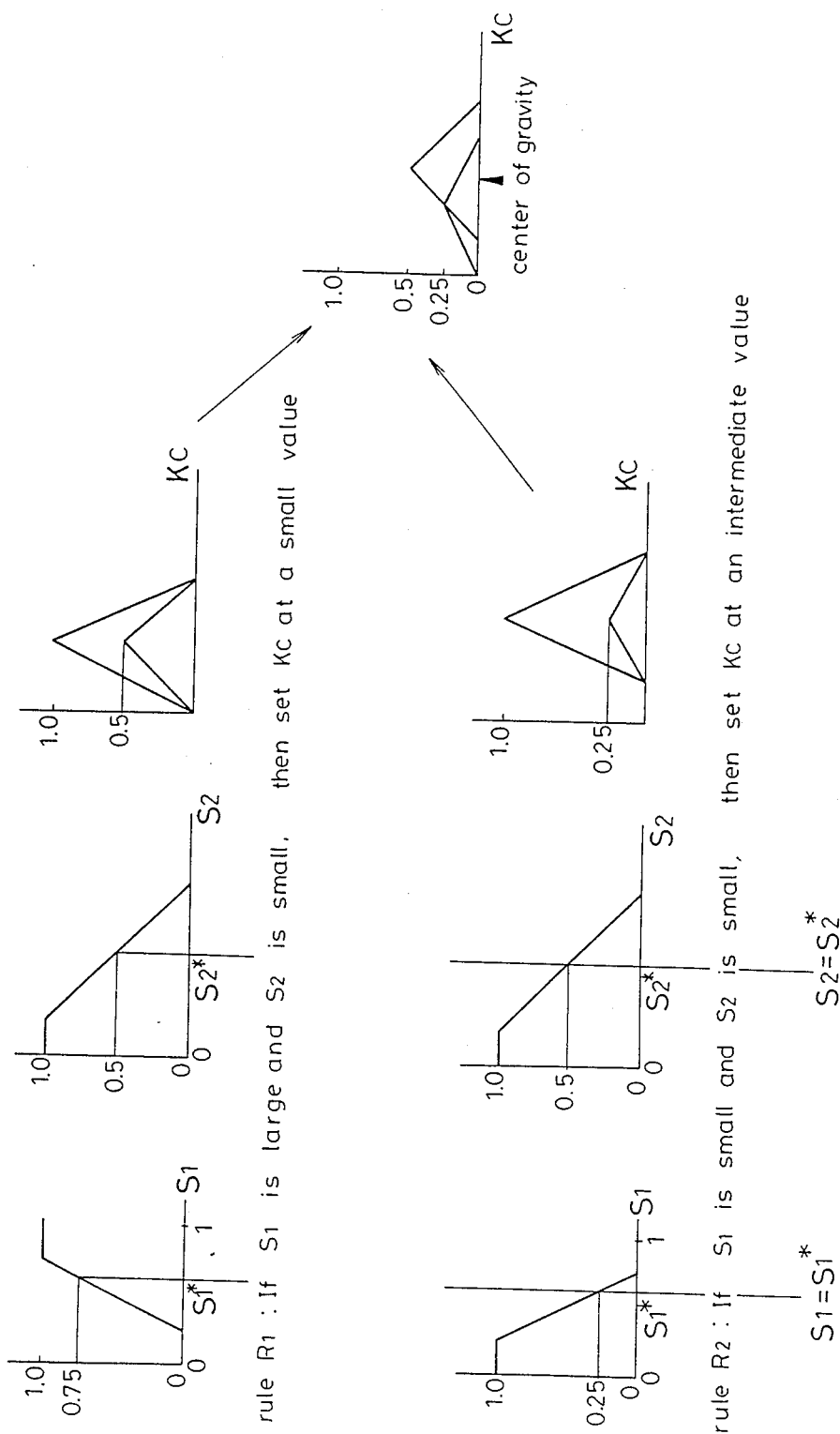
FIG. 12 is a diagram showing the mechanism of the fuzzy reasoning of the third embodiment.

FIG. 12 shows the mechanism of this position type fuzzy reasoning. Herein, the $S_1$ and $S_2$ of the above-described formulae (20) and (21) are selected as characteristics variables, and $R_1$ and $R_2$ which are described below are used as reasoning rules.

$R_1$: "If $S_1$ is large and $S_2$ is small, then set $K_C$ at a small value."

$R_2$: "If $S_1$ is small and $S_2$ is also small, then set $K_C$ at an intermediate value."

First, it is evaluated to what degree the present state satisfies the condition of the former part proposition of the fuzzy reasoning rule. Herein, it is assumed that the values of $S_1$ and $S_2$ are such that $S_1 = S_1^*$ and $S_2 = S_2^*$, respectively. These values are evaluated by the membership functions. For example, with respect to the reasoning rule $R_1$, the propositions "$S_1$ is large" and "$S_2$ is small" are evaluated to be satisfied with to the degree of 0.75 and 0.5, respectively, as shown in the left side two graphs at the upper stage of FIG. 12. Then, it is assumed that the entirety of the former part proposition of the rule $R_1$ is satisfied with to the degree of 0.5 from the lower value among them.

Next, the membership function of the latter part proposition "then set $K_C$ at a small value" is weighted by the degree of 0.5 to which the former part proposition is satisfied. This manner is shown in the third from the left graph at the upper stage of FIG. 12.

Finally, the weighted membership functions of the latter part propositions of the respective rules $R_1$ and $R_2$ are superimposed so as to calculate the center of gravity. The value of the gain $K_C$ at the center of gravity is adopted as the optimum gain.

The integration time and differentiation time are also reasoned similarly as above, and the optimum control parameters are reasoned by this way by the position type fuzzy reasoner 10.

Figure 13:
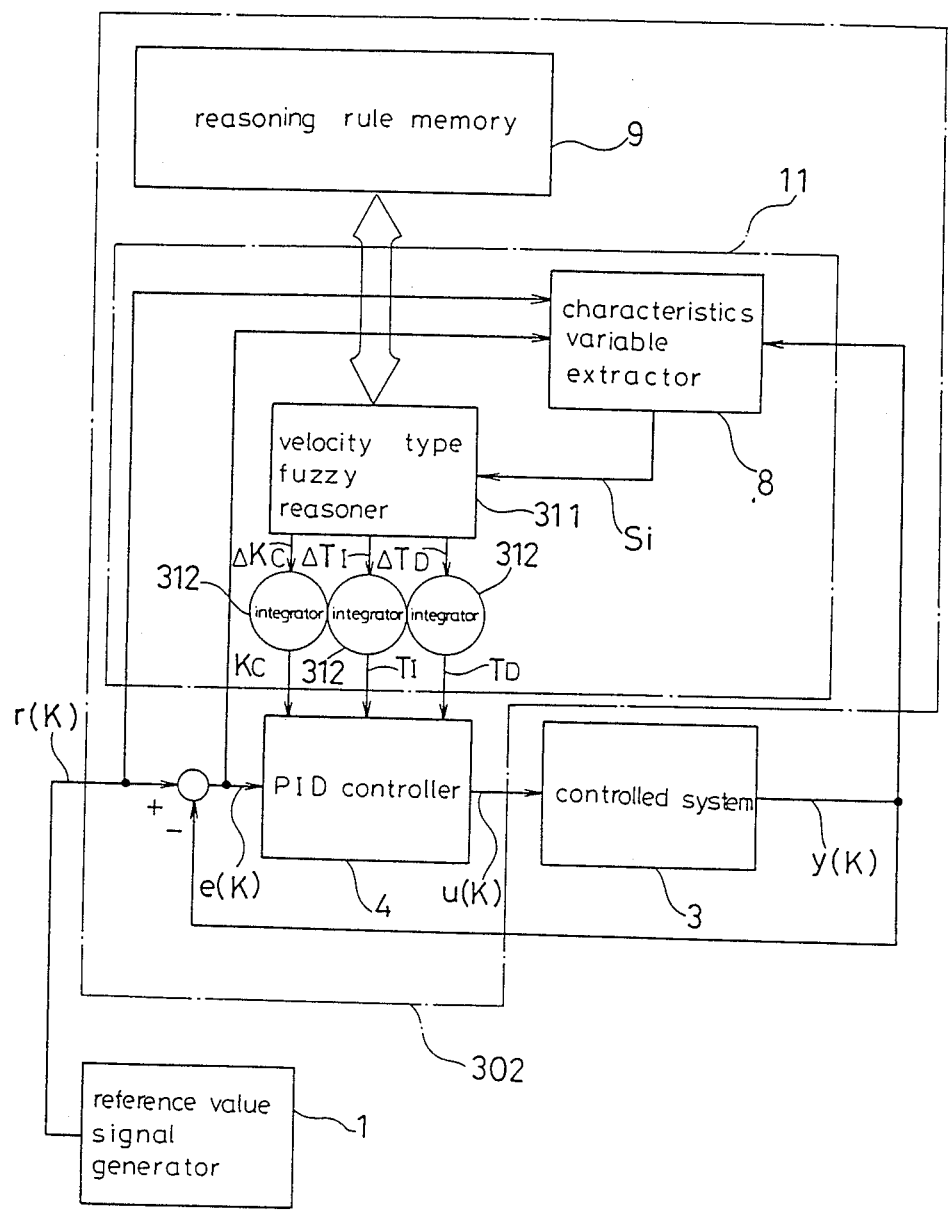
FIG. 13 is a block diagram showing a fourth embodiment of the present invention.

FIG. 13 shows a fourth embodiment of the present invention. In FIG. 13 the same reference numerals designate the same or corresponding elements as those shown in FIGS. 1, 5, and 9.

The internal construction of the adjustment section 11 for adjusting the control parameters of this embodiment will be described. The reference character 8 designates a characteristics variable extractor which has the same or similar function as that of the above-described embodiments. The reference numeral 311 designates a velocity type fuzzy reasoner which receives the characteristics variable $S_i$ as its input and reason to what degree the control parameters, that is, the gain $K_C$, integration time $T_I$, and differentiation time $T_D$ should be adjusted from their present values in order to optimize the same, and outputs the adjustment variables $\Delta K_C$, $\Delta T_I$, and $\Delta T_D$. The reference numeral 312 designates an integrator which receives $\Delta K_C$, $\Delta T_I$, or $\Delta T_D$ as its input, and integrates the same to output an actual parameter $K_C$, $T_I$ or $T_D$. The control parameters output from the integrator 312 are given to the controller 4 to be used for calculating the manipulated variable u(k) from the error e(k). The reference numeral 302 designates an auto-tuning controller of this fourth embodiment.

Figure 14:
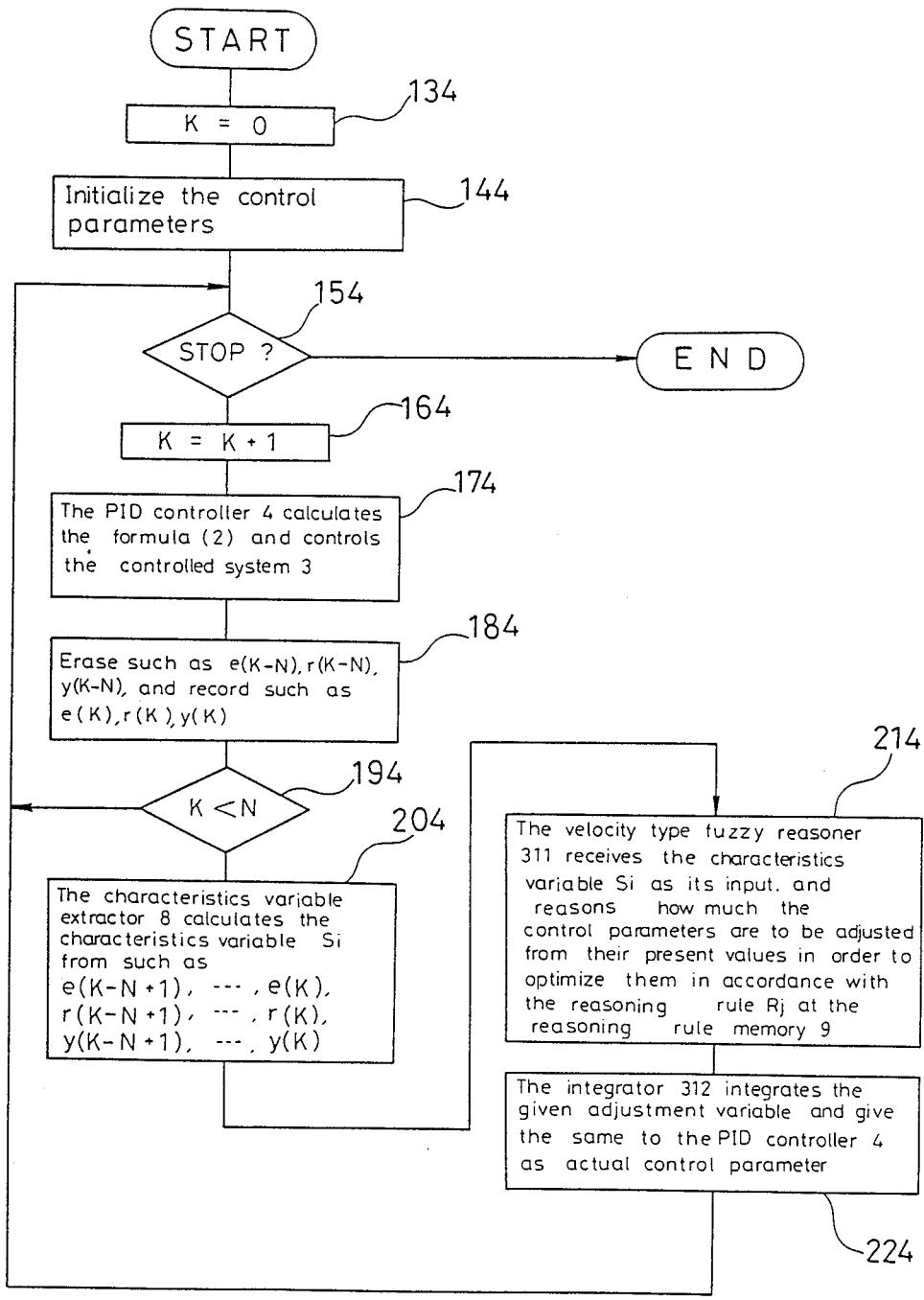
FIG. 14 is a flowchart describing the operation of the fourth embodiment.

The operation of this fourth embodiment will be described with reference to the flowchart of FIG. 14.

In an auto-tuning controller using a velocity type fuzzy reasoner automatic adjustment can be conduted at an arbitrary time in conducting the control. In this regard an example in which the automatic adjustment is always conducted during the control operation is shown.

First, the value of K is set to 0 at step 134. Next, the control parameters are initialized at step 144. The values are set at sufficiently safe values in terms of stability rather than in view of response and preciseness.

Until it is judged that the control system is to be stopped, the auto-tuning controller of this embodiment repeats the operation of the steps 164 to 224.

At step 174 the PID controller 4 calculates e(k) from the formula (2) with the use of the present control parameters and controls the controlled system 3.

At step 184, such variables as the error e(i−N), the manipulated variable u(k−N), and the controlled variable y(k−N) recorded at the timing (k−N) are erased, and new respective data e(k), u(k), and y(k) are recorded.

At step 194 it is judged as to whether the above-described data e(.), u(.), and y(.) are collected over N samples or not. Until the collection of the data is completed the step returns to prior step 154.

At step 204 the characteristics variable extractor 8 calculates the characteristics variable $S_i$: i=1, 2, ..., n from the over N samples of collected data e(k−N+1), ..., e(k), r(k−N+1), ..., r(k), y(k−N−1), ..., y(k). As the characteristics variable $S_i$ the mean error $S_1$ and the mean error change rate $S_2$ which are represented by the formulae (14) and (15) are used.

At step 214 the velocity type fuzzy reasoner 11 receives the input characteristics variable $S_i$, and determines how much the control parameters should be adjusted from the present values in order to optimize the control parameters in accordance with the reasoning rule $R_j$: j=1, 2, ..., m stored in the reasoning rule memory 8, and outputs the values, that is, the adjustment variable of the gain $\Delta K_C$, the adjustment variable of the integration time $\Delta T_I$, and the adjustment variable of the differentiation time $\Delta T_D$.

At step 224 the integrators 312 integrate the input adjustment variables $\Delta K_C$, $\Delta T_I$, and $\Delta T_D$, respectively, and output the actual control parameters $K_C$, $T_I$, and $T_D$ to the PID controller 4.

The auto-tuning controller 302 controls the controlled system 3 with automatic adjustment of the control parameters by repeating the above-described operations.

In this fourth embodiment of the present invention, the velocity type fuzzy reasoner 311 which conducts the velocity type fuzzy reasoning is provided. The operation thereof will be described as follows.

In fuzzy reasoning it is evaluated to what degree the present state satisfies with the condition of the former part proposition with the use of the membership function, and it is represented by a value between 0 and 1 as already shown in FIG. 3.

FIG. 15 shows the mechanism of reasoning conducted by the velocity type fuzzy reasoner 11. Herein, the mean error $S_1$ and the mean error change rate $S_2$ are selected as characteristics variables, and $R_1$ and $R_2$ which are described below and shown in FIG. 15 are used as reasoning rules.

$R_1$: "If $S_1$ is small and $S_2$ is also small, then keep $K_C$ at the present value."

$R_2$: "If $S_1$ is small and $S_2$ is large, then set $K_C$ at a small value."

In this place only the adjustment of the gain is described for simplification.

First, the degrees to which the former part propositions of the fuzzy reasoning rules $R_1$ and $R_2$ are satisfied are evaluated as described above. In the example of FIG. 15 the proposition "If $S_1$ is small" of the rule $R_1$ is satisfied to the degree of 0.5, and the proposition "$S_2$ is also small" of the rule $R_1$ is satisfied to the degree of 0.2. It is judged that the entirety of the former part proposition of the rule $R_1$ is satisfied to the degree of 0.2 from the lower value among the two degrees.

The latter part proposition is also represented by the membership function. This membership function is weighted by the degree to which the former part proposition was satisfied. In the rule $R_1$ the latter part proposition is weighted by a factor of 0.2.

Finally, the weighted membership functions of the latter part propositions of the respective rules are superimposed, and the center of gravity is calculated. The gain $K_C$ at this center of gravity is adopted as the optimum gain adjustment variable $\Delta K_C$.

Similarly as above the optimum integration time adjustment variable $\Delta T_I$ and the optimum differentiation time adjustment variable $\Delta T_D$ are reasoned.

The velocity type fuzzy reasoner 311 reasons the optimum adjustment variables of the control parameters as described above, and these values are outputted to the controller 4 as actual control parameters through the integrators 312.

FIG. 16 shows a fifth embodiment of the present invention. In FIG. 16 the same reference numerals designate the same elements as those shown in FIGS. 1, 5, 9, and 13. In this fifth embodiment an error switch 408 is provided at a stage prior to the PID controller 4 so of an to select one as error input e(k) which is the error between the reference value signal r(k) and the output y(k) of the controlled system 3 and an error input e(k) which is the error between the test signal t(k) and the output y(k). Furthermore, the auto-tuning controller 402 of this fifth embodiment receives the reference value signal r(k) and the controlled variable y(k) and outputs the manipulated variable u(k). The output y(k) of the controlled system 3 is fed back to the auto-tuning controller 402. In this embodiment the adjustment section for adjusting the control parameters is constituted by the characteristics variable extractor 8, the velocity type fuzzy reasoner 412, and the test signal generator 409.

Figure 17:
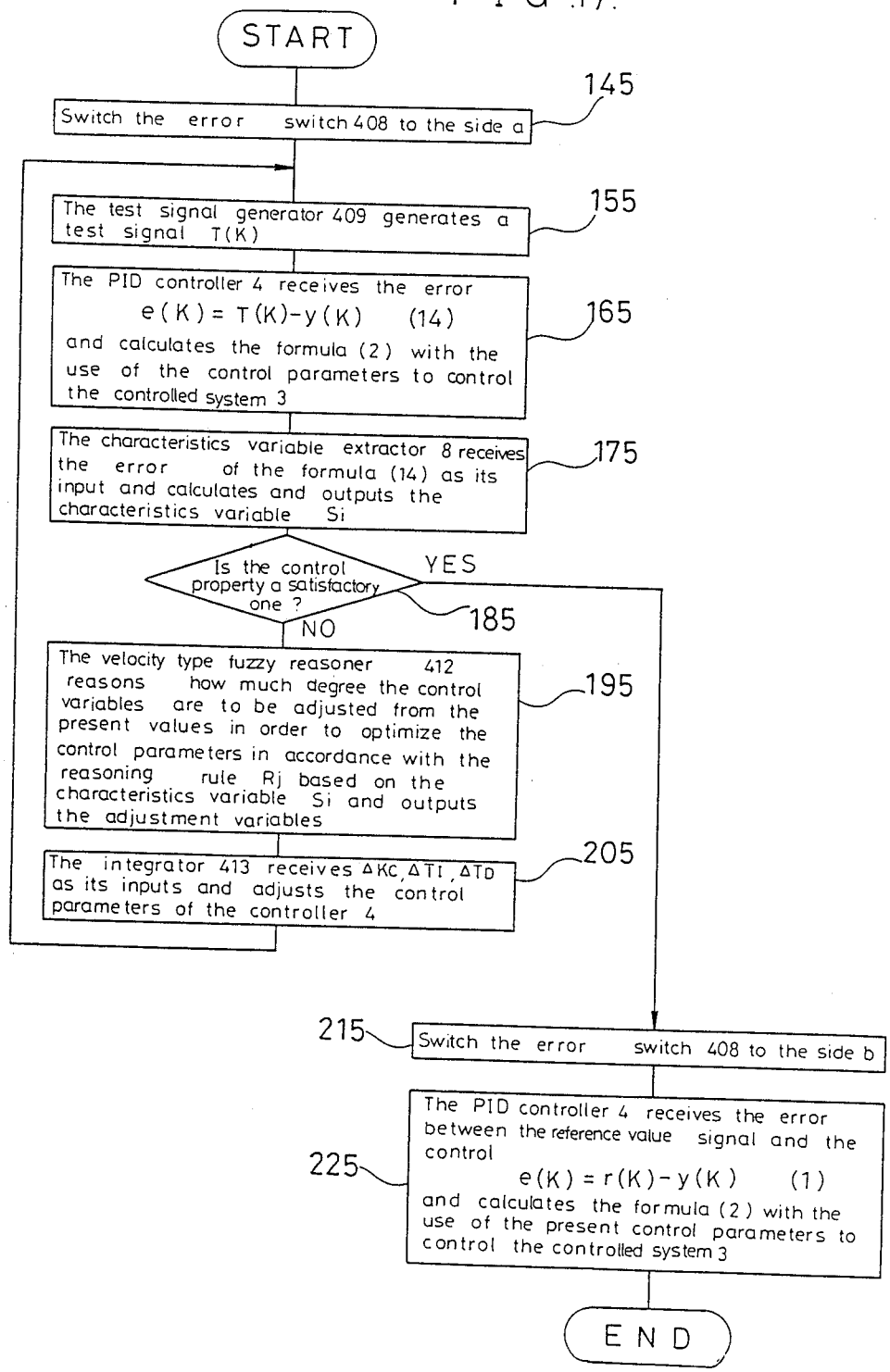
FIG. 17 is a flowchart describing the operation of the fifth embodiment.
Figure 19:
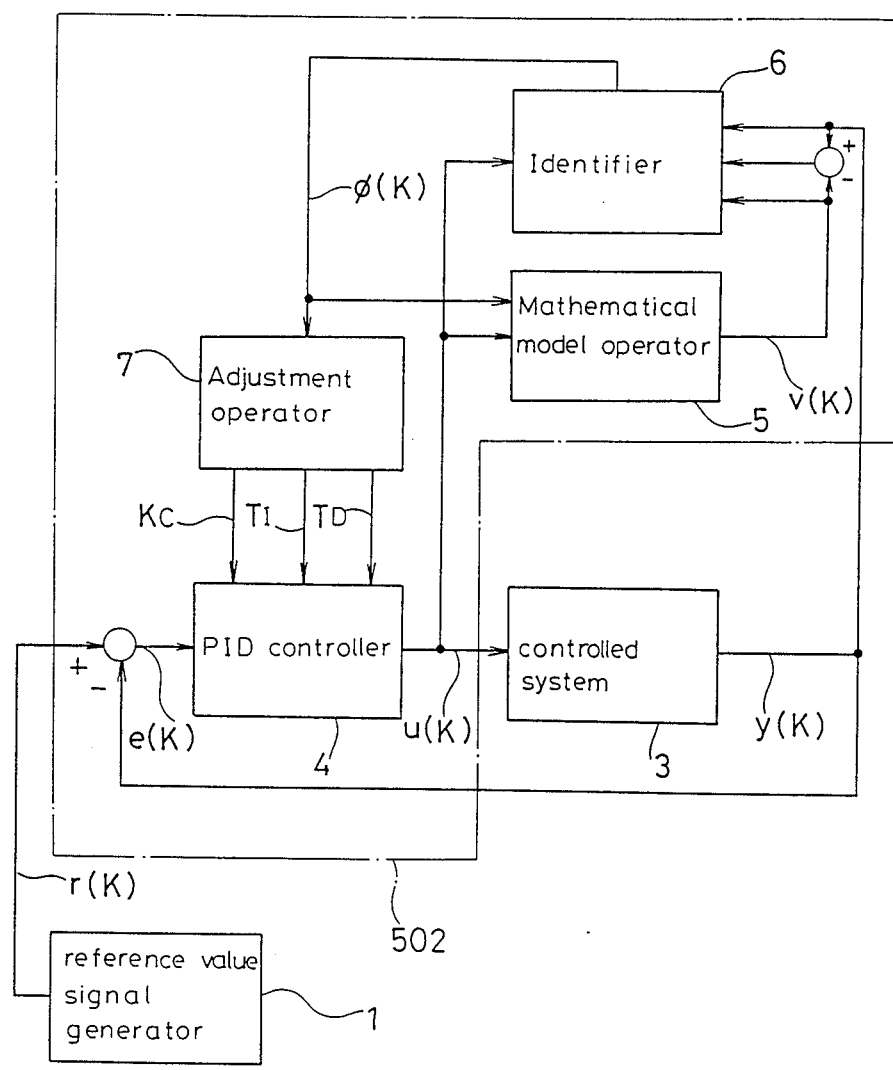
FIG. 19 is a block diagram showing a prior art auto-tuning controller.

The operation of this fifth embodiment will be described with reference to the flowchart of FIG. 17.

The operation of this fifth embodiment is separated into the former part steps 145 to 205 of the automatic adjustment mode for conducting the automatic adjustment of the control parameters and the latter part steps 215 and 225 of the control mode for conducting the usual control in accordance with the control parameters adjusted at the above-described former part steps.

First, at step 145 the error switch 8 is switched to the side a so as to enter the adjustment mode.

At steps 155 to 175 the PID controller 4 receives the error between the test signal T(k) and the controlled variable y(k) as its input, $$e(k) = T(k) - y(k) \quad (14)$$

and controls the controlled system 3. Meanwhile, the characteristics variable extractor 8 receives e(k) as its input, and calculates and outputs the characteristics variable $S_i$.

At step 185 it is judged whether the control property of the control system at present is a satisfactory one or not from the characteristics variable $S_i$.

When the present control property is not a satisfactory one, the step proceeds to the steps 195 and 205, and the velocity type fuzzy reasoner 12 reasons how much the control parameters should be adjusted in order to make the control property a satisfactory one. Then, the integrator 413 adds the adjustment variable to the present value of the control parameter and gives the result to the controller 4.

Thereafter, the step again returns to the step 155 and the above-described operation is repeated.

On the other hand, when the present control property is judged to be a satisfactory one at step 185 the step proceeds to the steps 215 to 225.

At step 215 the mode is switched from the adjustment mode to the control mode. At step 225 the device is in a usual control mode and the controller conducts the control of the controlled system 3 in accordance with the reference value signal r(k).

The characteristics variable $S_i$ which is output from the characteristics variable extractor 8, the reasoning rule $R_j$ stored in the reasoning rule memory 9, and the velocity type fuzzy reasoning conducted by the velocity type fuzzy reasoner 412 will be described. Herein, only the adjustment of the gain will be described for simplification.

FIG. 18 shows the mechanism of the velocity type fuzzy reasoning. Herein, as the characteristics variable $S_i$ the $S_1$ and $S_2$... represented by the formulae (20) and (21) and shown in FIG. 11 are used. That is, a pulse response of the controlled system 3 is utilized similarly as in the third embodiment. $R_1$ and $R_2$ which are described below are used as the reasoning rules.

$R_1$: "If $S_1$ is large and $S_2$ is small, then set the gain $K_C$ at a little smaller value."

$R_2$: "If $S_1$ is small and $S_2$ is also small, then keep the gain $K_C$ at the present value."

First, it is evaluated to what degree the present state satisfies with the condition of the former part proposition of the fuzzy reasoning rule. Herein, it is assumed that the values of $S_1$ and $S_2$ are actually such that $S_1 = S_1^*$ and $S_2 = S_2^*$. These values are evaluated by the membership functions. For example, with respect to the reasoning rule $R_1$, the propositions "If $S_1$ is large" and "If $S_2$ is small" are evaluated to be satisfied to the degree of 0.75 and 0.5, respectively, as shown in the left side two graphs at the upper stage of FIG. 18. It is judged that the entirety of the former part proposition of the rule $R_1$ is satisfied with to the degree of 0.5 from the lower value among them.

Next, the membership function of the latter part proposition "then set $K_C$ at a little smaller value" is weighted by the degree to which the former part proposition comes was satisfied. This manner is shown in the third from the left graph at the upper stage of FIG. 18.

The above-described operations are conducted with respect to the respective rule $R_j$, and finally the weighted membership functions of the latter part propositions of the respective rules are superimposed. Thereafter, the center of gravity is calculated, and this calculated center of gravity is adopted as the optimum gain adjustment variable $\Delta K_C$.

The reasonings are also conducted for the integration time and the differentiation time similarly as above, and the velocity type fuzzy reasoner 412 outputs the respective optimum adjustment variables $\Delta T_I$ and $\Delta T_D$.

The optimum control parameter adjustment variables $\Delta K_C$, $\Delta T_I$, and $\Delta T_D$ are outputted to the controller 4 through the integrators 413 as actual control parameters, that is, $K_C$, $T_I$, and $T_D$.

In the above illustrated embodiments auto-tuning controllers which automatically adjust the gain, the integration time, and the differentiation time use a PID controller, but the present invention can be also applied to other types of auto-tuning controller. For example, the present invention can be applied to an auto-tuning controller which includes a controller which, including an ON, OFF, and unsensitive zone, automatically adjusts the width of the unsensitive zone. The present invention can be also applied to an auto-tuning controller which includes an optimum control controller which, based on the modern ages control theory, automatically adjusts the parameters of the evaluation function.

As is evident from the foregoing description, according to the present invention, the control parameters of the controller are fuzzy reasoned from the characteristics variables of the waveforms such as the input error or the controlled system response in accordance with the reasoning rules which are obtained from the experience rules and perceptions of human beings and previously stored, whereby the automatic adjustments of the control parameters can be conducted by simple operations of membership functions without conducting identification which undesirably restricts the type of the controlled system and which is also a complicated procedure. This enables conducting an automatic adjustment at a light operation load and at a short time, and conducting an automatic adjustment over a wide range of controlled systems.

What is claimed is:

1. An auto-tuning controller, comprising:
   a controller for controlling a system by outputting a control signal in response to an error signal, based upon at least one control parameter;
   reference value signal generator means for generating a reference signal;
   means for developing said error signal as a difference between said reference signal and a controlled variable outputted by said system which is indicative of its operating state; and adjustment means for adjusting said at least one control parameter, including characteristic variable extractor means responsive to said error signal for developing a characteristic variable representing an operational state of said system, and fuzzy reasoner means responsive to said characteristic variable for adjusting said at least one control parameter in accordance with a predetermined reasoning rule.

2. The controller of claim 1, wherein said fuzzy reasoner means includes means for determining the degree to which said characteristic variable satisfies said reasoning rule and means for adjusting said at least one control parameter based upon said determined degree of satisfaction.

3. An auto-tuning controller, comprising:

a controller for controlling a system by outputting a control signal in response to an error signal, based upon at least one control parameter;

reference value signal generator means for generating a reference signal;

means for developing said error signal as a difference between said reference signal and a controlled variable outputted by said system which is indicative of its operating state;

a test signal generator for generating a test signal;

switch means for selecting one of said control signal and said test signal to be inputted to said system;

characteristic variable generator means responsive to said test signal and said controlled variable for developing a characteristic variable representing an operational state of said system when provided with said test signal; and fuzzy reasoner means responsive to said characteristic variable for adjusting said at least one control parameter in accordance with a predetermined reasoning rule.

4. The controller of claim 3, wherein said fuzzy reasoner means includes means for determining the degree to which said characteristic variable satisfies said reasoning rule and means for adjusting said at least one control parameter based upon said determined degree of satisfaction.

5. An auto-tuning controller as defined in claim 3, wherein said test signal is a step signal.

6. An auto-tuning controller, comprising:

a controller for controlling a system by outputting a control signal in response to an error signal, based upon at least one control parameter;

reference value signal generator means for generating a reference signal;

test signal generator means for generating a test signal;

switch means for selecting one of said reference signal and said test signal as an output;

means for developing said error signal as a difference between either of said reference and test signals outputted by said switch means and a controlled variable outputted by said system which is indicative of its operating state;

characteristic variable generator means responsive to said test signal, said controlled variable, and said error signal as a difference between said test signal and said controlled variable for developing a characteristic variable representing an operational stae of said system; and fuzzy reasoner means responsive to said characteristic variable for adjusting said at least one control parameter in accordance with a predetermined reasoning rule.

7. The controller of claim 6, wherein said fuzzy reasoner means includes means for determining the degree to which said characteristic variable satisfies said reasoning rule and means for adjusting said at least one control parameter based upon said determined degree of satisfaction.

8. An auto-tuning controller as defined in claim 6, wherein said test signal is a pulse signal.

9. An auto-tuning controller, comprising:

a controller for controlling a system by outputting a control signal in response to an error signal, based upon at least one control parameter;

reference value signal generator means for generating a reference signal;

means for developing said error signal as a difference between said reference signal and a controlled variable outputted by said system which is indicative of its operating state; and adjustment means for adjusting said at least one control parameter, including characteristic variable extractor means responsive to said error signal for developing a characteristic variable representing an operational state of said system, velocity type fuzzy reasoner means responsive to said characteristic variable for calculating an adjustment variable in accordance with a predetermined reasoning rule, and integrator means for integrating said adjustment variable to produce an optimum control parameter to be inputted to said controller.

10. An auto-tuning controller, comprising:

a controller for controlling a system by outputting a control signal in response to an error signal, based upon at least one control parameter;

reference value signal generator means for generating a reference signal;

test signal generator means for generating a test signal;

switch means for selecting one of said reference signal and said test signal as an output;

means for developing said error signal as a difference between either of said reference and test signals outputted by said switch means and a controlled variable outputted by said system which is indicative of its operating state;

characteristic variable generator means responsive to said test signal, said controlled variable, and said error signal as a difference between said test signal and said controlled variable for developing a characteristic variable representing an operational stae of said system; and velocity type fuzzy reasoner means responsive to said characteristic variable for calculating an adjustment variable in accordance with a predetermined reasoning rule; and integrator means for integrating said adjustment variable to produce an optimum control parameter to be inputted to said controller.

11. The controller of claim 10, wherein said fuzzy reasoner means includes means for determining the degree to which said characteristic variable satisfies said reasoning rule and means for adjusting said at least one control parameter based upon said determined degree of satisfaction.

* * * * *